(12) United States Patent
Boniske et al.

(10) Patent No.: US 10,976,737 B2
(45) Date of Patent: Apr. 13, 2021

(54) SYSTEMS AND METHODS FOR DETERMINING SAFETY EVENTS FOR AN AUTONOMOUS VEHICLE

(71) Applicant: GM GLOBAL TECHNOLOGY OPERATIONS LLC, Detroit, MI (US)

(72) Inventors: Albert Boniske, San Francisco, CA (US); George Hines, Kensington, CA (US); Sandra Lennie, San Mateo, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 638 days.

(21) Appl. No.: 15/819,339

(22) Filed: Nov. 21, 2017

(65) Prior Publication Data

US 2018/0074501 A1 Mar. 15, 2018

(51) Int. Cl.
*G05D 1/00* (2006.01)
*G05D 1/02* (2020.01)
*G07C 5/08* (2006.01)
*B60W 50/04* (2006.01)

(52) U.S. Cl.
CPC .......... *G05D 1/0088* (2013.01); *B60W 50/04* (2013.01); *G05D 1/0055* (2013.01); *G05D 1/0257* (2013.01); *G07C 5/0841* (2013.01); *B60W 2540/30* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2012/0083960 A1* | 4/2012 | Zhu | B60R 1/00 701/23 |
| 2012/0223833 A1* | 9/2012 | Thomas | G08B 21/0446 340/539.12 |
| 2016/0358475 A1* | 12/2016 | Prokhorov | G05D 1/0022 |
| 2017/0166222 A1* | 6/2017 | James | B60W 40/09 |
| 2018/0127000 A1* | 5/2018 | Jiang | G05D 1/0088 |
| 2018/0130347 A1* | 5/2018 | Ricci | G08G 1/0112 |
| 2018/0136644 A1* | 5/2018 | Levinson | G05D 1/0027 |
| 2018/0170392 A1* | 6/2018 | Yang | B60W 40/09 |
| 2019/0049958 A1* | 2/2019 | Liu | G01S 13/865 |

* cited by examiner

*Primary Examiner* — Navid Ziaeianmehdizadeh
(74) *Attorney, Agent, or Firm* — Lorenz & Kopf, LLP

(57) ABSTRACT

Systems and methods are provided for performing autonomous vehicle operation analysis. A method includes sensor data being received from sensor devices that is representative of an environment and operation of a human-operated vehicle. Human event data is determined based upon the received sensor data. Event data associated with operation of an autonomous vehicle is received. The human event data is correlated with the autonomous vehicle event data based upon degree of similarity of human-operated vehicle events and autonomous vehicle events with respect to driving scenarios. Safety-related analysis is generated, by the one or more data processors, based upon the correlated human-operated vehicle events and autonomous vehicle events.

16 Claims, 8 Drawing Sheets ary in nature.

SYSTEMS AND METHODS FOR DETERMINING SAFETY EVENTS FOR AN AUTONOMOUS VEHICLE

TECHNICAL FIELD

The present disclosure generally relates to autonomous vehicles, and more particularly relates to systems and methods for determining safety events for an autonomous vehicle.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Autonomous vehicle sensors acquire a significant amount of data about objects surrounding the autonomous vehicle as well as about other environmental factors. Analysis and use of this data assist with safe driving. Accordingly, it is desirable to provide systems and methods that facilitate the understanding of data from sensors and other sources and how they relate to safe operations of autonomous vehicles. It is further desirable to provide methods and systems for classifying safety events related to autonomous vehicles. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for controlling an autonomous vehicle. In one embodiment, a method and system are provided for performing autonomous vehicle operation analysis. Sensor data is received from sensor devices and is representative of an environment and operation of a human-operated vehicle. Human event data is determined, by one or more processors, based upon the acquired sensor data. Event data associated with operation of an autonomous vehicle is received, by the one or more data processors. The human event data is correlated, by the one or more data processors, occurs with the autonomous vehicle event data based upon degree of similarity of human-operated vehicle events and autonomous vehicle events with respect to driving scenarios. Safety-related analysis is generated, by the one or more data processors, based upon the correlated human-operated vehicle events and autonomous vehicle events.

In embodiments, a method and system are provided for performing autonomous vehicle operation analysis. Sensor data is received from sensor devices and is representative of an environment and operation of a human-operated vehicle. Human event data is determined, by one or more processors, based upon the acquired sensor data. Event data associated with operation of an autonomous vehicle is received, by the one or more data processors. The human event data is correlated, by the one or more data processors, occurs with the autonomous vehicle event data based upon degree of similarity of human-operated vehicle events and autonomous vehicle events with respect to driving scenarios. Safety-related analysis is generated, by the one or more data processors, based upon the correlated human-operated vehicle events and autonomous vehicle events. The generated safety-related analysis evaluates degrees of vehicle safety between human-operated vehicles and autonomous vehicles under equivalent driving scenarios.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
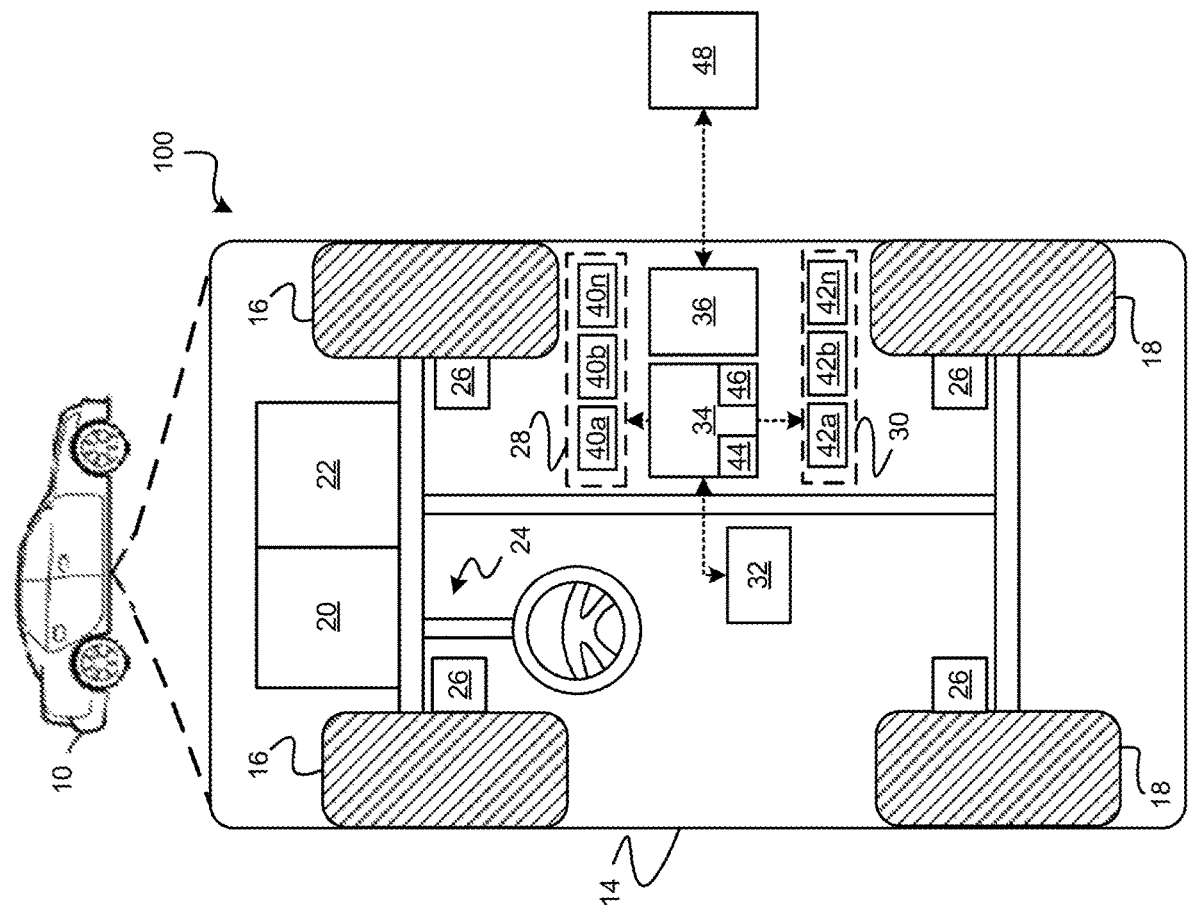
FIG. 1 is a functional block diagram illustrating an autonomous vehicle, in accordance with various embodiments.

With reference to FIG. 1, a system for performing an autonomous vehicle control shown generally as 100 is associated with a vehicle 10 in accordance with various embodiments. In general, the system 100 provides for low level processing of three-dimensional images of surroundings of the vehicle 10, in the form of point clouds, to determine velocity of surrounding objects for use in controlling the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 100, and/or components thereof, are incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous or other vehicle that utilizes a navigation system and/or other systems to provide route guidance and/or implementation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also in various embodiments, the data storage device 32 stores processing algorithms and data for processing three-dimensional point clouds to determine velocity of objects in the surroundings on a frame by frame basis. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured for use in processing three-dimensional imaging data of surroundings of the vehicle 10 in the form of point clouds to determine velocity on a frame by frame basis for use in autonomous control of the vehicle.

Figure 2:
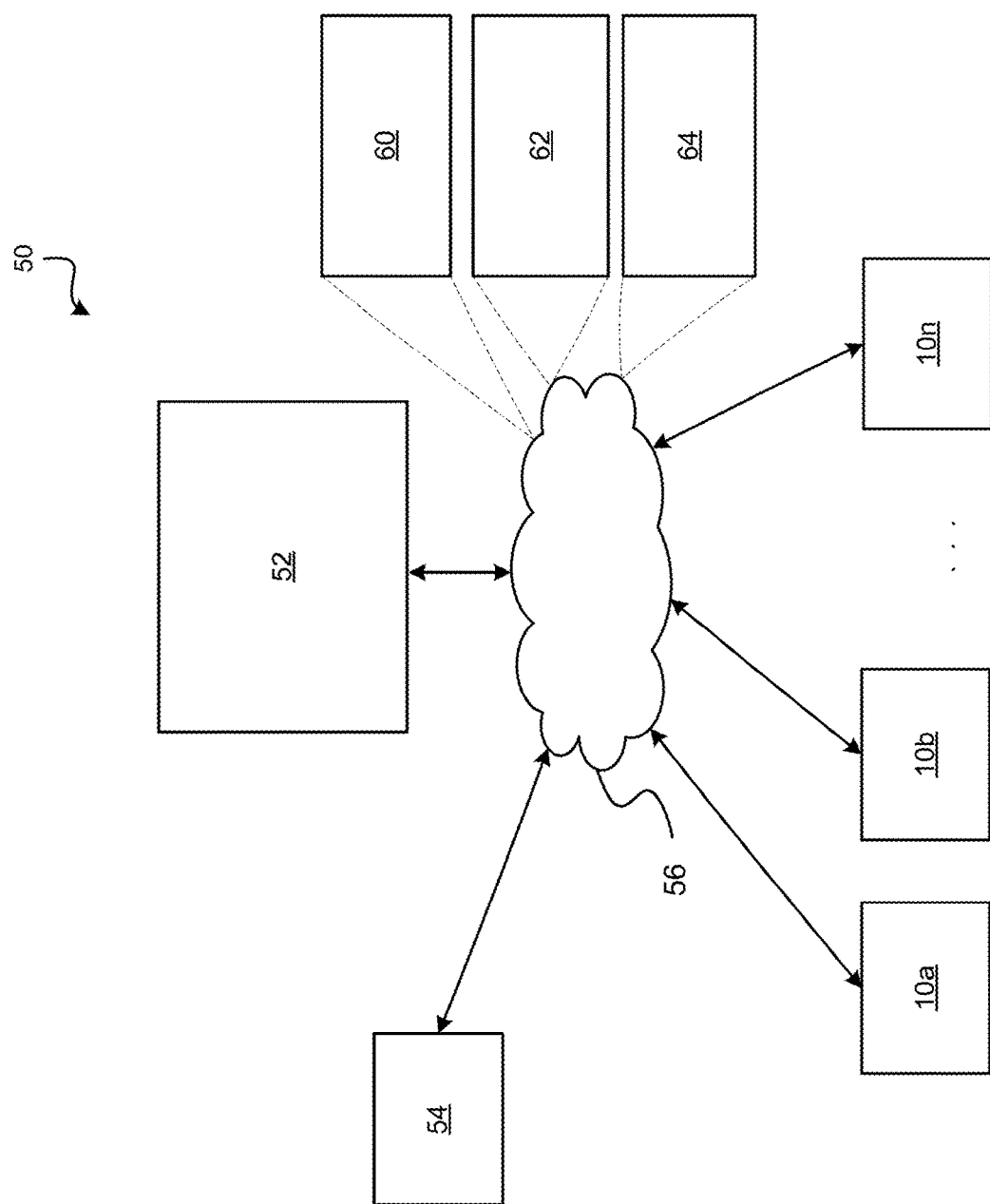
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including lane markings for roadways along the various routes, and whether and to what extent particular route segments are impacted by construction zones or other possible hazards or impediments that have been detected by one or more of autonomous vehicles 10a-10n.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
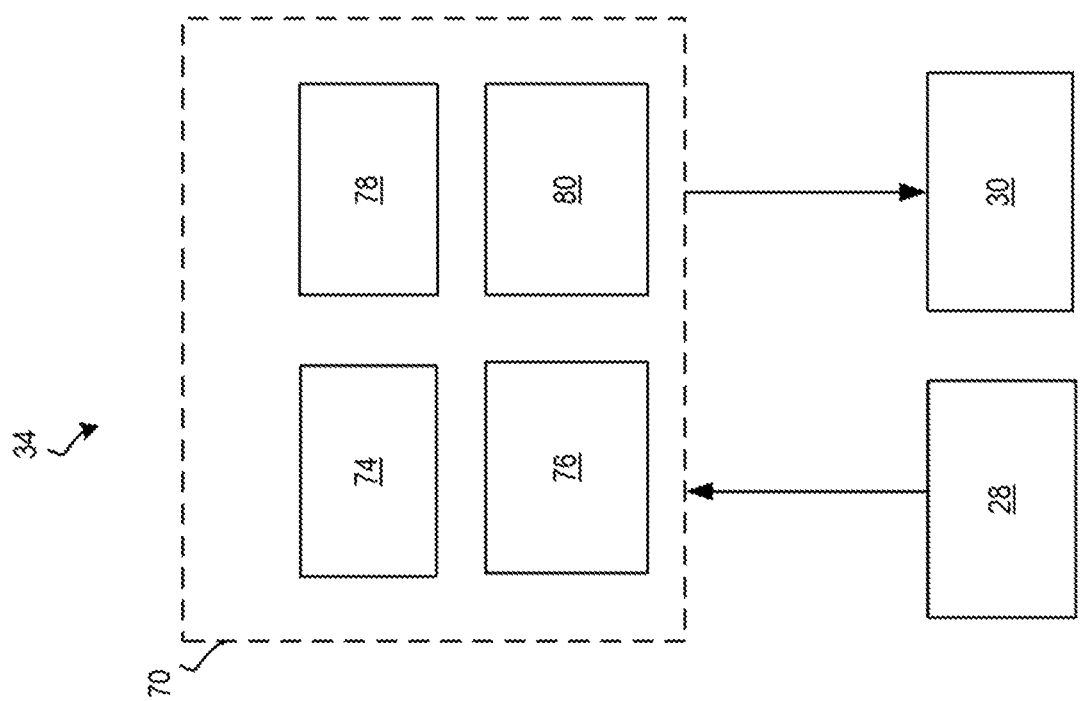
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
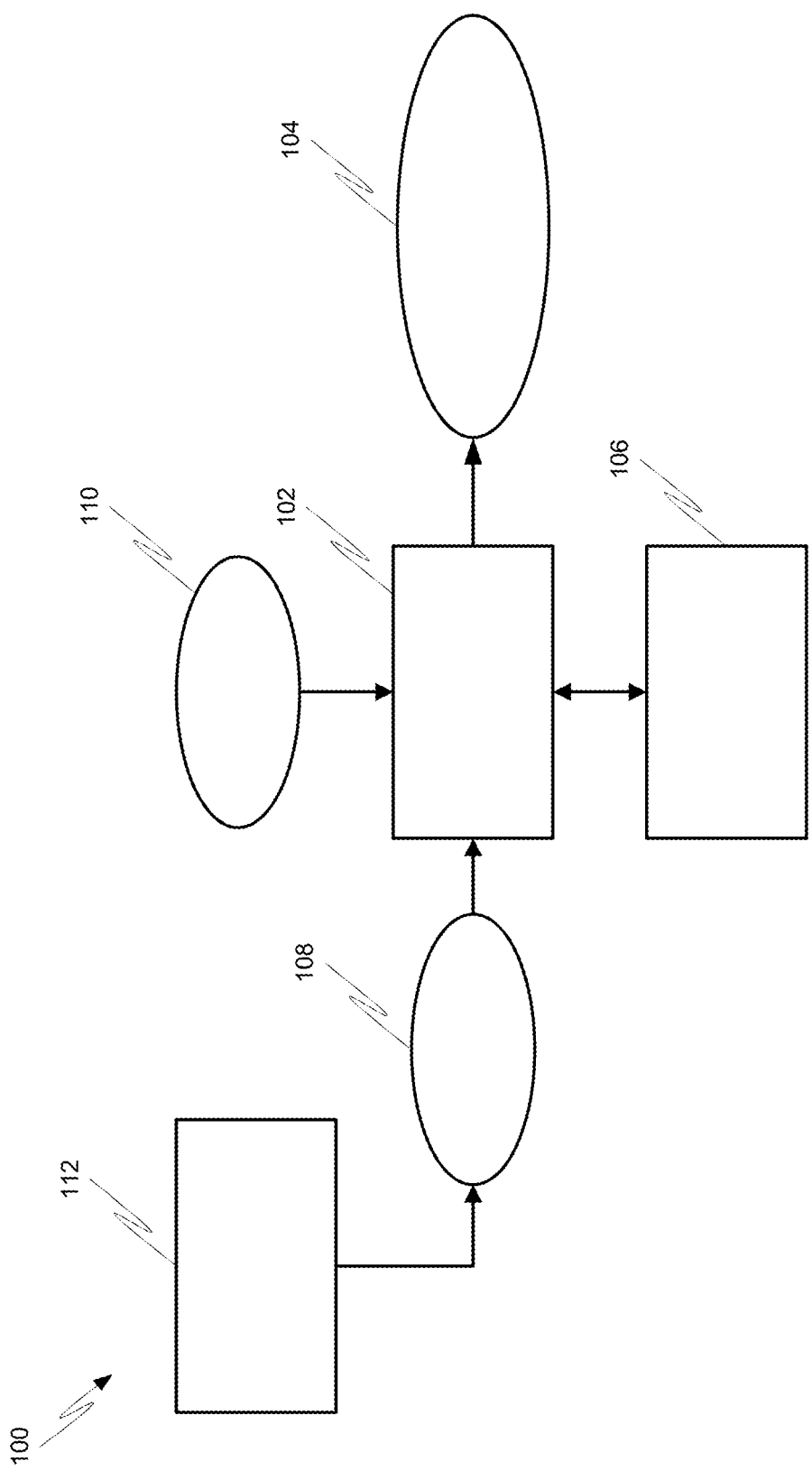
FIG. 4 is a functional block diagram depicting a safety event processing system, in accordance with various embodiments.

For example, as shown in more detail at 100 with regard to FIG. 4 and with continued reference to FIG. 3, a safety event processing system 102 generates a structured comparison 104 between human driving safety events and autonomous vehicle safety events. The comparison 104 allows for an objective safety performance evaluation between human-operated vehicle events and autonomous vehicle events despite the inherently disparate nature between these types of events. The safety event processing system 102 can generate comparisons 104 for many different types of events, such as comparing unsafe hard-braking human safety events to similar autonomous vehicle operational events and how each performed.

The system 102 generates the comparison 104 by performing safety event correlation operations 106 upon sensor data 108 and autonomous vehicle related driving data 110. For example, correlation operations 106 can involve sifting through sensor data 108 and the autonomous vehicle-related driving data to identify the portions of such driving data that contain only right-hand turns performed by the human-operated vehicle 112 and an autonomous vehicle and determining the level of safety associated with each. A comparison 104 includes how the determined safety levels of the autonomous vehicle fared with respect to the determined safety levels of the human-operated vehicle. The correlation operations 106 can also be more finely focused to associate which aspects of the human-based right-hand turn correspond to which aspects of the right-hand turn performed by the autonomous vehicle. As an illustration, in the situation where a human is operating the vehicle, the human operator's attention may be diverted to the right side of the road as the vehicle creeps forward to turn right. The human operator may not notice that a person is jaywalking across the street. By the time the human operator notices the jaywalking person in this scenario, the vehicle is too close to the person and the human operator slams on the brakes, thereby creating a hard braking event in order to avoid the jaywalker. The safety event processing system 102 would identify in the autonomous vehicle-related driving data 110 corresponding right hand turns performed by the autonomous vehicle (e.g., by identifying the autonomous vehicle approaching an intersection and performing a right turn maneuver). In such a situation, the autonomous vehicle would have avoided such a situation because it monitors through its sensors "360°" around the vehicle. In such a situation, the safety event processing system 102 processes the sensor data 108 from the situation involving the human-operated vehicle 112 and correlates it to how the autonomous vehicle responded in an equivalent driving scenario as represented in the autonomous vehicle driving data 110, that is, the autonomous vehicle performed the right turn without an unsafe hard braking event occurring, and thus, the comparison 104 would show that the safety level associated with the autonomous vehicle is better than the safety level of the human-operated vehicle 112 for that situation. It is noted that the human-operated vehicle can be any type of vehicle that is being entirely operated by a human and is equipped with sensors to provide the sensor data 108. Such a human-operated vehicle can be an autonomous vehicle being operated in a manual model or a vehicle without the capability of operating in an autonomous mode.

Figure 5:
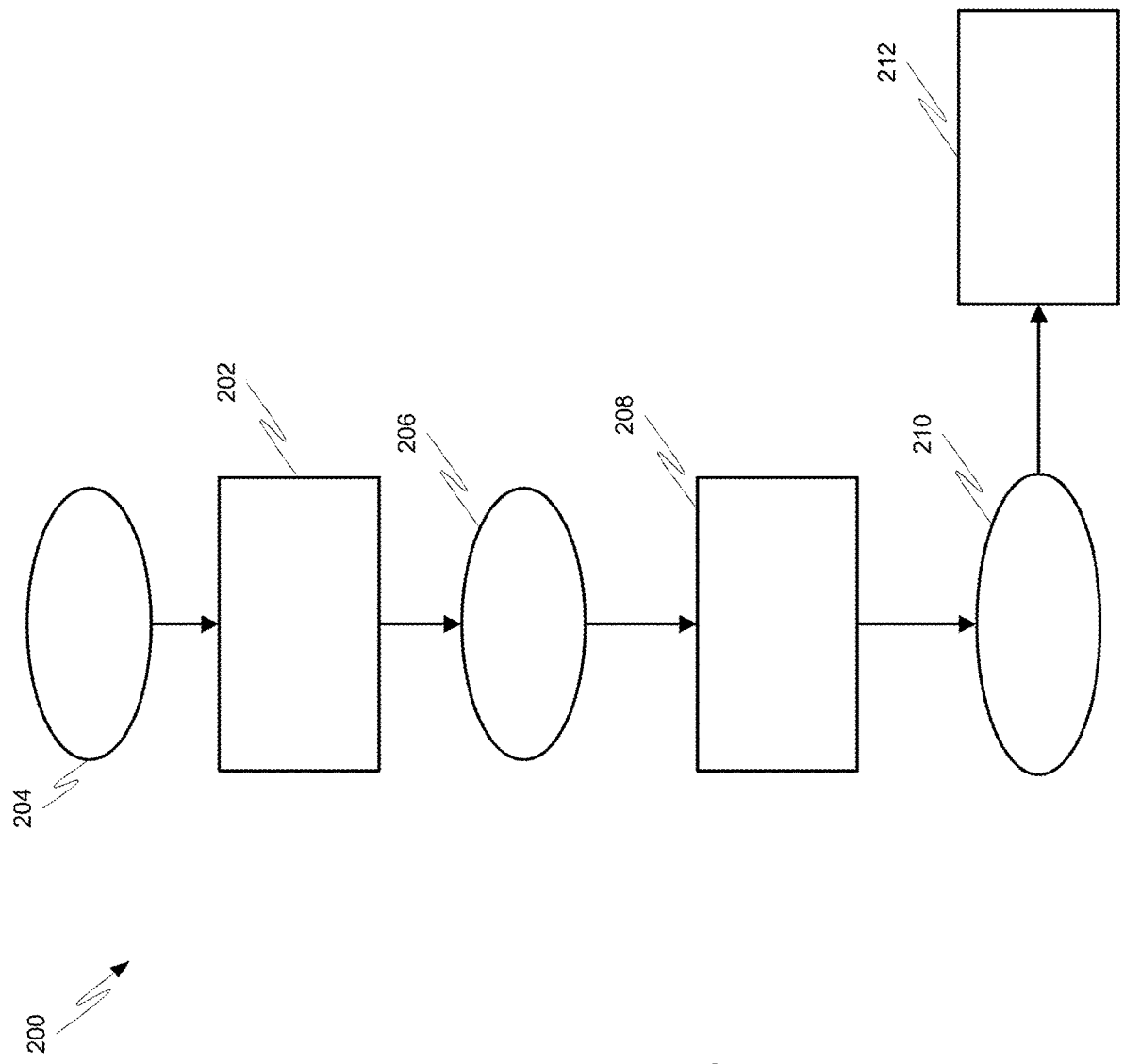
FIGS. 5 and 6 are functional block diagrams illustrating processing of vehicle sensor data for safety event comparisons between human and autonomous vehicle operations.

FIG. 5 depicts at 200 an operational flow for the safety event processing system 102. In this operational scenario, human event data is captured at 202. Inputs for capturing human event data 202 can include the drive data from a vehicle's sensor stack. A vehicle's sensor stack contains layers of sensor information of different degrees of details or operational areas, such as location information of where the vehicle was on the map, what visually was captured by the vehicle's sensors, and what the vehicle did relative to objects within its environment. This may also involve identifying kinematic triggers 204 associated with the autonomous vehicle, such as vehicle lateral and longitudinal g-forces and jerk measurements. As an illustration, a hard braking incident resulting from human operation of the vehicle can be identified by lateral and longitudinal g-forces and jerk measurements as not satisfying safe operation thresholds.

Process block 202 analyzes the kinematic triggers 204 in order to identify human event data 206. Human event data 206 as captured from the kinematic triggers 204 are used to identify safety events. The captured human event data 206 becomes the object for comparison to autonomous vehicle events.

In one example embodiment, the captured human event data 206 can be expressed as a series of measurements over time (e.g., $t_0$, $t_1$, $t_2$, . . . $t_n$). Each point in time can be associated with a particular set of measurements that can be used by process block 208 to identify the specific type of safety event that is most likely associated with the time series. As an example, a time series may show braking measurements over a particular time interval where hard braking had occurred, and another time series may show steering-related measurements fluctuating greatly over time (e.g., an aggressive steering event). The time series data values are compared to vehicle driving models that provide parameters and constraints as to what a hard braking event resembles or what an aggressive steering event resembles. As another example, an event can include a specific maneuver such as maneuvering around a double-parked vehicle, taking a right at a heavily congested four-way stop sign intersection, etc. These examples illustrate that many different types of safety events can occur, such as hard braking events, aggressive steering events, driving in congested areas, etc.

Process block 208 further examines the time series data with respect to safety-related thresholds or other criteria and determines whether excessive braking, steering, or other type activity has occurred. In the excessive braking scenario, process block 208 would characterize this as an unsafe hard braking event. In the excessive steering scenario, process block 206 would characterize the event data as an unsafe swerving type of event so as to avoid a person if the sensor data indicates the person was in the way of the vehicle. After generation of the classifications 210 of the safety events and types, process block 212 correlates the safety event data 210 to autonomous vehicle driving data in a manner depicted in FIG. 6.

Figure 6:
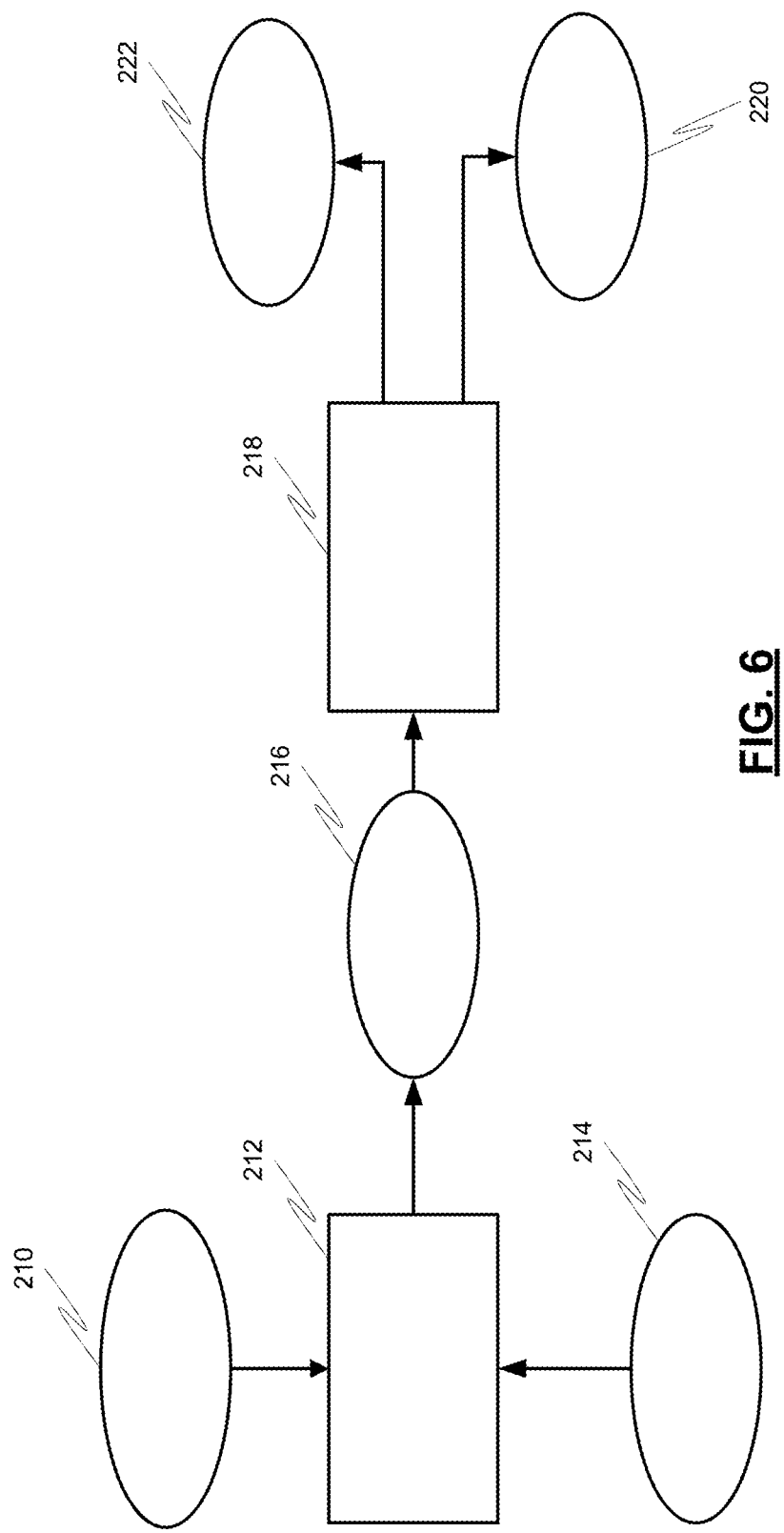

FIG. 6 depicts that process block 212 can use autonomous vehicle-related data, such as takeover data 214, when correlating human safety event data to autonomous vehicle driving data. Takeovers are when a human driver takes control of an autonomous vehicle, such as when a human driver feels compelled to hit the brake, etc.

Process block 212 generates correlated data 216 based on the degree of correlation between human event classification data 210 and takeover data 214. The correlated data 216 operates as a structured comparison between the human and autonomous vehicle safety-related data. For example, the comparison can be considered structured in that human operated driving data and autonomous vehicle-operated driving data are each broken down into a set of time series data and then the driving actions associated with the time series data are compared to determine the level of safety of each and whether one met or exceeded the other's safety level. Stated differently, the structured comparison characterizes human events (as initially represented on the vehicle with the stack running) to equivalent driving scenarios for an autonomous vehicle. In one exemplary embodiment, the correlations can be expressed by different categories designating the degree to which human and autonomous vehicle events are correlated. In this example, a low level of correlation for two events can be termed "similar" and implies identical concept domains (e.g., both events relate to an equivalent driving scenario involving a left turn, etc.) for both data elements. The highest level of correlation can be termed "identical" which includes not only the same concept but also the equivalent driving situation based on similar surrounding vehicle orientations and velocities, road geometry, etc. Other designations can be used as intermediate categories to indicate additional degrees of correlation, thereby providing a greater degree of resolution. Still further, it should be understood that other indicators for degree of correlation can be utilized, such as numerical outputs from a neural network. The neural network can be trained based on training data that already contains the human and autonomous driving data and their corresponding human and autonomous vehicle correlation values. The neural network's input layer would receive the human and the human and autonomous driving data, with the weights being adjusted during training to predict the proper correlation values.

The output correlated data 216 establishes a baseline for comparing autonomous vehicle events to human events by indicating which driving patterns in the human driving data correspond to the same or similar driving patterns in the autonomous driving data. Once the baselines are established, the situations that qualify as a safe type of human operation can be used to determine what is safe for the analogous autonomous vehicle activity. As an illustration, sensor data that represents a successful left turn for a good human driver within a crowded intersection can describe what a successful left turn can be for an autonomous vehicle.

Process block 218 generates performance metrics 220 for quantifying how much safer the autonomous vehicle performed in comparison to human-operated vehicles for similar driving events. The performance metrics 220 further indicate how human driving operations appear from a kinematic behavior perspective. For example, the performance metrics 220 can describe what a successful left turn in a crowded intersection as performed by a human operator would appear from a kinematic behavior perspective. Mathematically describing the successful left turn based on road geometry and how the human directed the vehicle during the turn can constitute a portion of the output of the performance metrics 220. Still further, the performance metrics 220 can indicate areas within an event where the human outperformed the autonomous vehicle from a safety perspective. Such information is helpful in assessing the vehicle operations that enhance or decrease safety for the autonomous vehicle, such as what did the human operator do in order to avoid a crash or hazardous situation. In general, the performance metrics 220 indicate overlaps between failures between autonomous vehicles and humans in similar events and what are the areas where they do not overlap (e.g., situations where humans do not perform well but autonomous vehicles do). This constitutes an improvement over analyzing the degree of safety based merely upon whether the vehicles were driving within the speed limit.

Process block 218 may also generate safety metrics 222 based upon the correlated data 216. The safety metrics 222 provide additional clarification as to what situations an autonomous vehicle operation operated in a safer manner relative to a corresponding human driving event. The additional clarification can include the safety metrics 222 providing statistical analysis of how often a human-operated vehicle performed better than the autonomous vehicle for a particular safety event category as well as indicating standard deviations from the averages of the driving performances. Overall, safety metrics 222 and performance metrics can help adapt the control of the autonomous vehicle so that the vehicle can operate in a safer manner.

Figure 7:
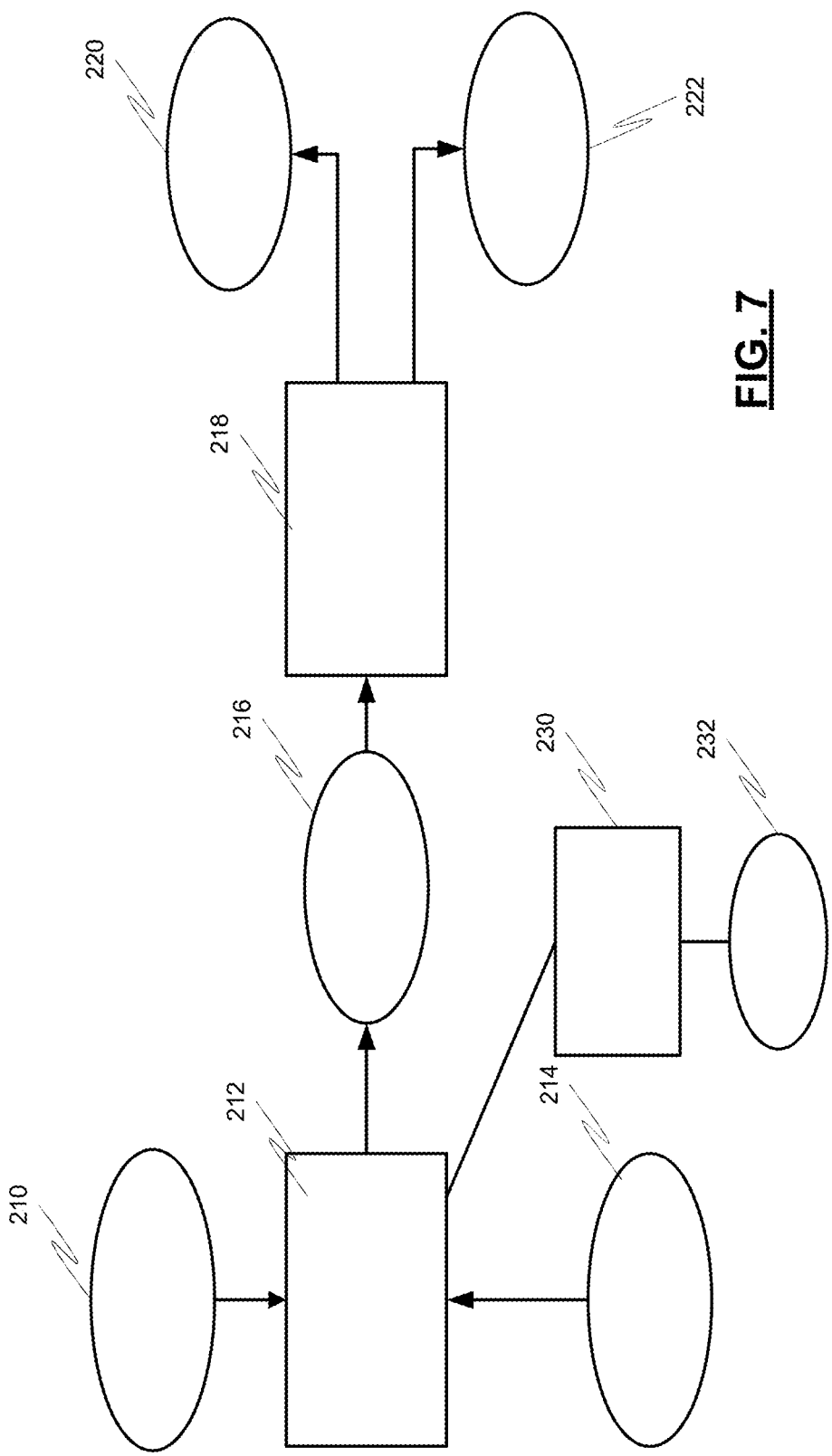
FIG. 7 is a functional block diagram illustrating use of an artificial neural network for correlating safety events between human and autonomous vehicle operations.

FIG. 7 illustrates that process block 212 performs correlation operations between the takeover data and human event data by using such techniques as an artificial neural network 230. The artificial neural network 230 can be structured with an input layer, one or more hidden layers, and an output layer. The input layer can be provided with one or more input nodes to receive information related to the classification of human safety event and types.

For receiving the takeover data 214, an additional set of input nodes can be used. One or more hidden layers within the artificial neural network 230 help to identify interrelationships between the classification data 210 and the takeover data 214. Because the interrelationships can be non-linear in nature, the artificial neural network can be better at identifying the interrelationships between the two sets of data. The nodes of the artificial neural network 230 can use many different types of activation functions, such as the sigmoid activation function, logistic activation function, etc. The output layer of the artificial neural network 230 reveals which human events in the classification data 210 have a relatively high degree of correlation with the takeover data 214. Training data 232 (with already determined correlations between classification data 210 and takeover data 214) helps establish the weights that interconnect nodes in one layer to a succeeding layer of the artificial neural network 230.

Figure 8:
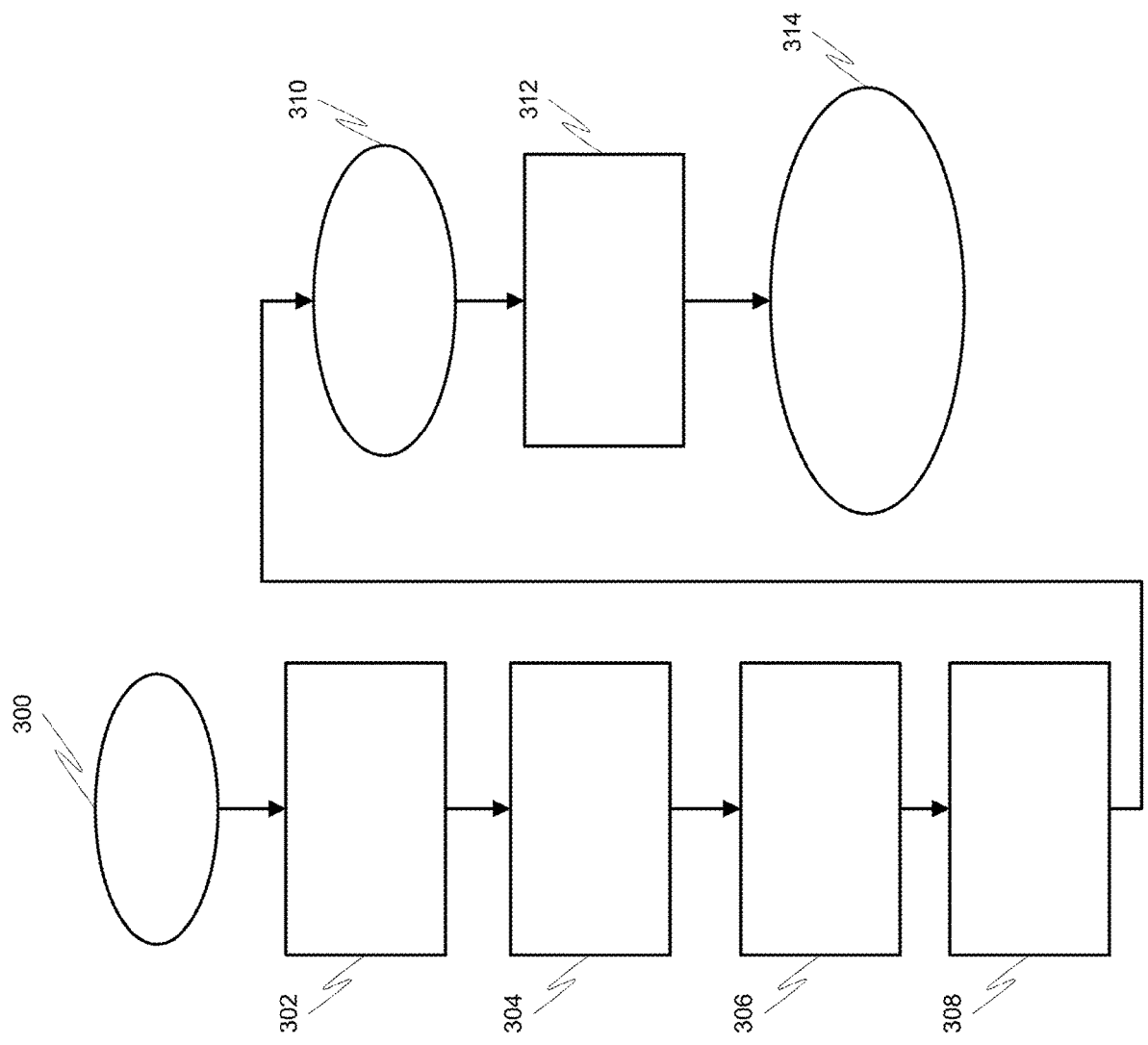
FIG. 8 is a flowchart depicting an operational scenario involving hard braking safety-related events.

FIG. 8 depicts an example of an operational scenario for obtaining a structured comparison of human events to autonomous vehicle driving events for safety braking-related assessments. In this operational scenario, a significant amount of sensor data 300 is acquired for processing. The significant amount of sensor data 300 is a result of capturing and storing all the vehicle sensor data, camera data, and actions that the vehicle has taken or was planning on taking within a particular window of time, etc.

Sensor data 300 in this operational scenario includes not only lateral and longitudinal g forces and jerk measurements, but also sensor readings about objects and other factors in the vehicle's environment. Process block 302 determines which objects (e.g., other vehicles, street signs, etc.) are sufficiently close to the vehicle as to warrant continued assessment. This assessment by process block 302 allows for a "360°" assessment of what other cars, people, and other objects may be around the vehicle.

Process block 304 captures human event data based upon the sensor data 300. This can include creating multiple time series for different types of sensor data and interrelating them with the object information generated by process block 302.

In this operational scenario, the captured human event data is analyzed for braking-related events at process block 306. For example, process block 306 can analyze the sensor readings for whether excessive force has been applied to the brakes, thereby resulting in a hard braking situation. Although braking-related sensor data is analyzed in this operational scenario, it should be understood that many other types of sensor data could be assessed, such as sensor data related to steering. Steering in an aggressive manner can indicate an unsafe situation such as where a human operator aggressively steered the vehicle in order to avoid a person that was too close to the car.

Process block 308 identifies safety events by examining the assessments performed by process blocks 304 and 306. For example, process block 308 analyzes the environmental sensor information from process block 304 and the braking-related sensor data from process block 306 to determine whether acceleration/deceleration to and from a stop sign are within pre-specified safety limits. For example, a human operator may have to apply an excessive amount of pressure upon the brakes (as determined by process block 306) in order to avoid a person that has been detected to be within the environment by process block 304. Process block 308 would identify this as an unsafe event involving a human driver and a hard braking scenario.

Process block 312 correlates the hard braking human safety event 310 with similar types of events as represented in the takeover data. The correlation can be based upon the takeover data having patterns of sensor data approximating that of human-related safety events and as recognized by machine learning techniques such as artificial neural networks. This correlation analysis may include assessing whether people and other vehicles have locations for the autonomous vehicle is similar to what was expressed in the sensor data 300 for the human-operated vehicle.

The result of the correlation by process block 312 is a structured comparison 314 that interrelates human safety events with corresponding autonomous vehicle safety events. In this braking-related operational scenario, a structured comparison 314 could interrelate human hard-braking events to similar events in the takeover data. As an illustration, the structured comparison 314 for the scenario may determine that a hard braking situation occurred with a human driver going around a double parked vehicle, whereas in a similar situation, no human takeover occurred for the autonomous vehicle. In this situation, a comparison of the two safety event shows that the autonomous vehicle operated in a safer manner. This may be due to the autonomous vehicle operating with greater information because of the continuous operation of its sensors. In this way, the structured comparison 314 provides an objective basis for establishing performance and safety metrics between human-operated vehicles and autonomous vehicles.

Other operational scenarios can involve different types of driving scenarios. For example, scenarios can involve analyzing and correlating human safety events to takeover data for acceleration/deceleration to and from a stop, turns at intersections, lane changes, yielding behavior in narrow roads (e.g., alleys or roads that only have room for a single car to pass at a time), etc.

The safety-related analysis includes not only comparison for the purposes of correlating unsafe human events to autonomous vehicle events but also includes other types of comparisons. For example, a human-operated vehicle safe events can be correlated with autonomous vehicle operations for determining what constitutes a safe driving activity in the autonomous vehicle domain. As an illustration, a human safely performing a right turn in crowded traffic can be correlated to a similar autonomous vehicle activity. Performance metrics can use such correlations as a measure of how safely an autonomous vehicle has operated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. For example, the systems and methods described herein can be performed where the human-operated vehicle and the autonomous vehicle are the same vehicle or different vehicles. The foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for performing autonomous vehicle operation analysis, the method comprising:
   receiving sensor data representative of an environment and operation of a human-operated vehicle;
   determining, by one or more data processors, human event data based upon the received sensor data;
   receiving, by the one or more data processors, event data associated with operation of an autonomous vehicle, wherein the operation of the autonomous vehicle is without a human operating the autonomous vehicle and is separately performed from the operation of the human-operated vehicle, wherein the event data associated with operation of an autonomous vehicle is from takeover data; wherein the takeover data represents driving situations where human takeover occurred with respect to a vehicle under autonomous control;
   correlating, by the one or more data processors, the human event data with the autonomous vehicle event data based upon a comparison of human-operated vehicle events and autonomous vehicle events with respect to driving scenarios;
   generating, by the one or more data processors, safety-related analysis based upon the correlated human-operated vehicle events and the autonomous vehicle events;
   wherein the generated safety-related analysis evaluates degrees of vehicle safety between human-operated vehicles and autonomous vehicles under equivalent driving scenarios by comparing vehicle operational performance between the human-operated vehicle and the operation of the autonomous vehicle; and
   adjusting vehicle control operations involving autonomous vehicles based upon the generated safety-related analysis.

2. The method of claim 1, wherein the correlated human event data and autonomous vehicle event data provide a structured comparison between human driving safety-related events and autonomous vehicle safety-related events.

3. The method of claim 1, wherein the sensor data is obtained by at least one of a lidar, a radar, and a camera for sensing the environment of the autonomous vehicle.

4. The method of claim 1, wherein the driving scenarios involve at least one of a hard-braking event, a right or left turn event, and avoidance of an object within the path of the human-operated vehicle.

5. The method of claim 1, wherein the received sensor data includes kinematic data of vehicle lateral and longitudinal g-forces and jerk measurements.

6. The method of claim 1, wherein the human event data is expressed as a series of measurements over time that describe vehicle operational scenarios.

7. The method of claim 1, wherein the human-operated vehicle and the autonomous vehicle are the same vehicle or different vehicles.

8. The method of claim 1, wherein performance-related metrics and safety-related metrics are generated based upon the correlated human-operated vehicle events and autonomous vehicle events under equivalent driving scenarios.

9. A system for performing autonomous vehicle operation analysis, the system comprising:

a storage device for storing instructions for performing safety analysis of autonomous vehicle operation; and one or more data processors configured to execute the instructions to:

receive sensor data representative of an environment and operation of a human-operated vehicle;

determine human event data based upon the received sensor data;

receive event data associated with operation of an autonomous vehicle, wherein the operation of the autonomous vehicle is without a human operating the autonomous vehicle and is separately performed from the operation of the human-operated vehicle, wherein the event data associated with operation of an autonomous vehicle is from takeover data; wherein the takeover data represents driving situations where human takeover occurred with respect to a vehicle under autonomous control;

correlate the human event data with the autonomous vehicle event data based upon a comparison of human-operated vehicle events and autonomous vehicle events with respect to driving scenarios;

generate safety-related analysis based upon the correlated human-operated vehicle events and the autonomous vehicle events;

wherein the generated safety-related analysis evaluates degrees of vehicle safety between human-operated vehicles and autonomous vehicles under equivalent driving scenarios by comparing vehicle operational performance between the human-operated vehicle and the operation of the autonomous vehicle; and adjust vehicle control operations involving autonomous vehicles based upon the generated safety-related analysis.

10. The system of claim 9, wherein the correlated human event data and autonomous vehicle event data provide a structured comparison between human driving safety-related events and autonomous vehicle safety-related events.

11. The system of claim 9, wherein the sensor data is obtained by at least one of a lidar, a radar, and a camera for sensing the environment of the autonomous vehicle.

12. The system of claim 9, wherein the driving scenarios involve at least one of a hard-braking event, a right or left turn event, and avoidance of an object within the path of the human-operated vehicle.

13. The system of claim 9, wherein the received sensor data includes kinematic data of vehicle lateral and longitudinal g-forces and jerk measurements.

14. The system of claim 9, wherein the human event data is expressed as a series of measurements over time that describe human-operated vehicle operational scenarios.

15. The system of claim 9, wherein performance-related metrics and safety-related metrics are generated based upon the correlated human-operated vehicle events and autonomous vehicle events under equivalent driving scenarios.

16. A non-transitory computer readable medium having stored there on instructions for performing autonomous vehicle operation analysis that, when executed, cause one or more data processors to:

receive sensor data representative of an environment and operation of a human-operated vehicle;

determine human event data based upon the received sensor data;

receive event data associated with operation of an autonomous vehicle, wherein the operation of the autonomous vehicle is without a human operating the autonomous vehicle and is separately performed from the operation of the human-operated vehicle, wherein the event data associated with operation of an autonomous vehicle is from takeover data; wherein the takeover data represents driving situations where human takeover occurred with respect to a vehicle under autonomous control;

correlate the human event data with the autonomous vehicle event data based upon a comparison of human-operated vehicle events and autonomous vehicle events with respect to driving scenarios;

generate safety-related analysis based upon the correlated human-operated vehicle events and the autonomous vehicle events;

wherein the generated safety-related analysis evaluates degrees of vehicle safety between human-operated vehicles and autonomous vehicles under equivalent driving scenarios by comparing vehicle operational performance between the human-operated vehicle and the operation of the autonomous vehicle; and adjust vehicle control operations involving autonomous vehicles based upon the generated safety-related analysis.

* * * * *